United States Patent [19]

Comeau

[11] Patent Number: 4,635,109
[45] Date of Patent: Jan. 6, 1987

[54] METHOD AND DEVICE FOR REMOTELY IDENTIFYING TV RECEIVERS DISPLAYING A GIVEN CHANNEL BY MEANS OF AN IDENTIFICATION SIGNAL

[75] Inventor: René Comeau, Alma, Canada

[73] Assignee: Cablovision Alma Inc., Quebec, Canada

[21] Appl. No.: 662,694

[22] Filed: Oct. 19, 1984

[30] Foreign Application Priority Data

Jun. 6, 1984 [CA] Canada ................... 455985

[51] Int. Cl.$^4$ ............................................. H04N 17/04
[52] U.S. Cl. ...................................................... 358/84
[58] Field of Search .............................. 358/84; 455/2

[56] References Cited

U.S. PATENT DOCUMENTS

| | | | |
|---|---|---|---|
| 2,896,070 | 7/1959 | Fremont et al. | 455/2 |
| 2,903,508 | 9/1959 | Hathaway | 358/84 |
| 2,947,858 | 8/1960 | Abbott | 455/2 |
| 3,299,355 | 1/1967 | Jenks et al. | 455/2 |
| 3,456,192 | 7/1969 | Mixsell et al. | 455/2 |
| 3,534,265 | 10/1970 | Mixsell et al. | 455/2 |
| 3,559,071 | 1/1971 | Mead et al. | 455/2 |
| 3,800,223 | 3/1974 | Mead | 358/84 X |
| 4,025,851 | 5/1977 | Haselwood et al. | 358/84 X |
| 4,161,751 | 7/1979 | Ost | 358/84 X |
| 4,163,254 | 7/1979 | Block et al. | 358/84 X |
| 4,336,554 | 6/1982 | Okada et al. | 358/124 |

FOREIGN PATENT DOCUMENTS

| | | | |
|---|---|---|---|
| 3318919 | 11/1984 | Fed. Rep. of Germany | 358/84 |
| 3401762 | 8/1985 | Fed. Rep. of Germany | 358/84 |

OTHER PUBLICATIONS

*Electronics Design*, "Electronics Helps Advertisers Keep Track of Their TV Ads," May 27, 1971, pp. 21 & 28.

*Primary Examiner*—Keith E. George
*Attorney, Agent, or Firm*—Robic, Robic & Associates

[57] ABSTRACT

A method and device for remotely identifying TV receivers tuned to a certain TV channel and displaying the video signal thereof. An identification signal is introduced in the television signal of the TV channel at its source before its transmission towards the TV receivers. The nature of the identification signal as well as the way of introducing it in the television signal are both selected so that this identification signal is irradiated in the air at the receivers end when these receivers display the video signal of the concerned channel, due to the phenomenom of cathode—ray—tube radiation caused by the presence of high voltages modulated by the luminance information at the luminance component frequencies. Detection of the irradiated identification signal in the proximity of one receiver indicates that it is tuned to the channel in question and displays the video signal thereof. If a different identification signal is introduced in the television signal of each TV channel, it can be determined which channel has its video signal displayed on a specific receiver by identifying the channel corresponding to the identification signal detected in the proximity of such a specific receiver. The method and device may be used for example to detect pirate decoders in a secured television system.

24 Claims, 4 Drawing Figures

FIG. 4

METHOD AND DEVICE FOR REMOTELY IDENTIFYING TV RECEIVERS DISPLAYING A GIVEN CHANNEL BY MEANS OF AN IDENTIFICATION SIGNAL

BACKGROUND OF THE INVENTION

1. Field of the Invention

The present invention relates basically to a method and a device for remotely identifying television receivers tuned to a certain television channel and displaying a video signal of this channel. By extension, the method and device of the invention can be used to remotely determine which channel has its video signal displayed through a specific television receiver.

The concept of the invention is to introduce an identification signal in the television signal of the television channel before transmission thereof towards the television receivers, which identification signal is selected and introduced in the television signal so that it is irradiated in the air through each television receiver and through the related equipments connected thereto when such a receiver is tuned to the channel in question and displays the video signal thereof. To irradiate the identification signal, the invention uses the radiation phenomenom inherent to television receivers and caused by the presence of high voltages applied to the CRT (cathode-ray-tube) and modulated by the CRT luminance information at the luminance component frequencies. Such a radiation phenomenom will be discussed in more details in the following description. If the irradiated identification signal is detected in the proximity of a television receiver, it can be determined that this receiver is tuned to the concerned channel and displays the video signal thereof.

A very interesting application of the method and device according to the present invention is for example to detect pirating of secured or scrambled television, such as detection of pirate PAY-TV decoders as will be seen in greater detail hereinafter. Another very interesting possible application is, as an example, regulating control in areas where television license fees are required by law (France, United Kingdom, Europe, etc . . . ) to differentiate between the use of television receivers with computers or VCR's (video cassette recorders), and with received broadcast signals.

2. Brief Description of the Prior Art

Known apparatuses detect the normal electromagnetic radiations from television receivers for remotely determining to which television broadcast station these television receivers are tuned at a given time. For example, the apparatus described in U.S. Pat. No. 2,896,070 (FREMONT et al) granted on July 21, 1959, comprises for this purpose a receiver which detects electromagnetic radiations emitted from the local oscillators of television receivers, and which uses these detected radiations in order to determine to which television broadcast station such receivers are tuned. Another apparatus described in U.S. Pat. No. 2,903,508 (HATHAWAY) granted on Sept. 8, 1959, also comprises a receiver adapted for remotely determining to which television broadcast station the television receiver of a residence is tuned, by comparing the phase of a synchronizing signal obtained from the video signal emitted by a television broadcast station with the phase of another similar signal irradiated from components of the television receiver in question.

The disadvantage of such prior art apparatuses is that they are limited to the analysis of the normal electromagnetic radiations from the television receivers, which analysis requires substantially complicated circuits and consequently reduces the reliability of these known apparatuses.

SUMMARY OF THE INVENTION

An object of the present invention is therefore to provide a method and a device which eliminate the above disadvantage by using the above described concept.

More specifically, the present invention proposes a method and a device for remotely identifying television receivers tuned to a specific television channel and displaying a video signal associated therewith. Such a method and device may be used in a television system comprising a source for producing a television signal including the video signal and corresponding to the specific television channel, a plurality of television receivers, and means for transmitting the television signal from the source to each television receiver. Each television receiver is situated at a respective position remote from the source, is provided with video reproducing means, and is connected to related equipments.

In the method and device of the invention, an identification signal is generated during predetermined time intervals of the video signal, and this generated identification signal is introduced in the television signal before transmission of the latter through the transmitting means. The identification signal is thus transmitted as part of the television signal from the source to each of the television receivers. The nature of the identification signal as well as the way of introducing it in the television signal are selected so that the identification signal is detected by each television receiver tuned to the specific channel and displaying its video signal, applied to the video reproducing means of such a television receiver, and irradiated in the air through the video reproducing means of such a television receiver and through at least a part of the related equipments connected thereto. The video reproducing means of each of the television receivers include a video screen and the predetermined time intervals are selected so that the identification signal cannot be visible on the video screen of the television receivers provided that these receivers have a standard adjustment. Detection of the irradiated identification signal in the proximity of one of the television receivers indicates that this television receiver is one of the receivers tuned to the specific channel and displaying the video signal thereof. This detecting step is carried out for each television receiver identification.

The identification signal generated during each predetermined time interval has a specific waveform and the predetermined time intervals are selected so that the detected irradiated identification signal has a waveform modified with respect to the specific waveform. This specific waveform is modified upon irradiation of the identification signal and can be recognized for preventing any false television receiver identification upon detection of any other signal.

It is possible to use the method and device of the present invention for determining which television channel has its video signal displayed through a specific television receiver by inserting an identification signal in the television signal of each channel which can be received by such a specific receiver, each identification signal including a code representative of the corresponding channel.

The objects, advantages and other features of the present invention will become more apparent from the following non-restrictive description of a possible embodiment thereof for one possible application, namely for locating PAY-TV decoders, which possible embodiment utilizes the concept of the present invention, and demonstrates and proves the validity of such a concept. This description will be made in conjunction with the accompanying drawings in which:

DETAILED DESCRIPTION OF THE PREFERRED EMBODIMENT

Figure 1:
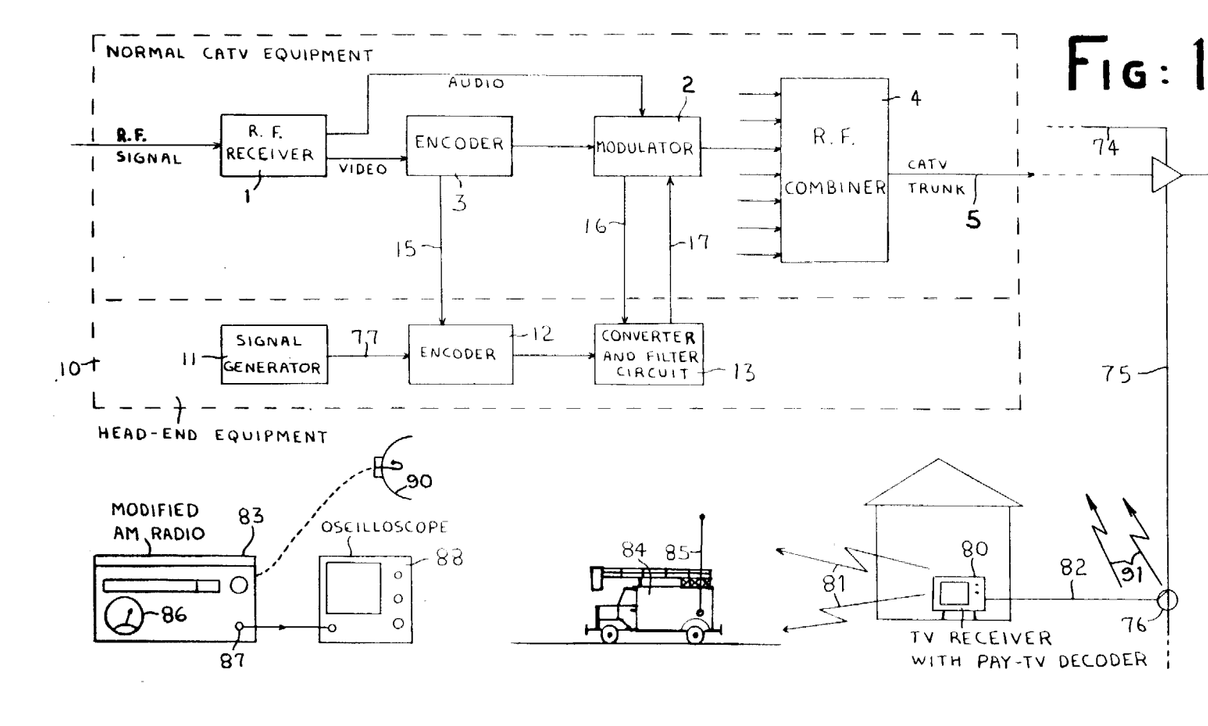
FIG. 1 is a functional block diagram showing a device for locating PAY-TV decoders in accordance with the present invention, and the principle of operation thereof.

Referring now to FIG. 1 of the drawings, the normal equipment of a community-antenna television (CATV) service company comprises conventionally, for each PAY-TV channel, a receiver 1 for receiving an R.F. signal of the corresponding PAY-TV channel. This receiver 1 extracts from the received R.F. signal the composite video signal and the audio signal of the PAY-TV channel. The audio signal is transmitted directly to a modulator 2 while the video signal is submitted to an encoder 3 before being supplied to this modulator 2. The purpose of the encoder 3 is of course to encode the video signal so that a PAY-TV decoder is necessary at the subscriber's end to decode such an encoded video signal. This composite video signal may be encoded, for example, by reducing of 6 dB the amplitude of the horizontal synchronizing pulses.

The signal at the output of the modulator 2, which corresponds to the output of the PAY-TV channel as illustrated on FIG. 1, is supplied to a corresponding input of an R.F. combiner 4 which supplies it, through the CATV trunk 5, to the distributing network of the CATV company, along with the signals of the other television channels applied to the other inputs of this combiner 4. The distributing network of the CATV company comprises distributing lines such as 74 and 75, and multi-tap connectors such as 76 for connection to the different subscribers.

The device for locating PAY-TV decoders comprises, as head-end equipment 10: a signal generator 11, an encoder 12, and a converter and filter circuit 13. The operation of this head-end equipment 10 will now be described with reference to FIGS. 1 and 2 of the drawings.

Figure 2:
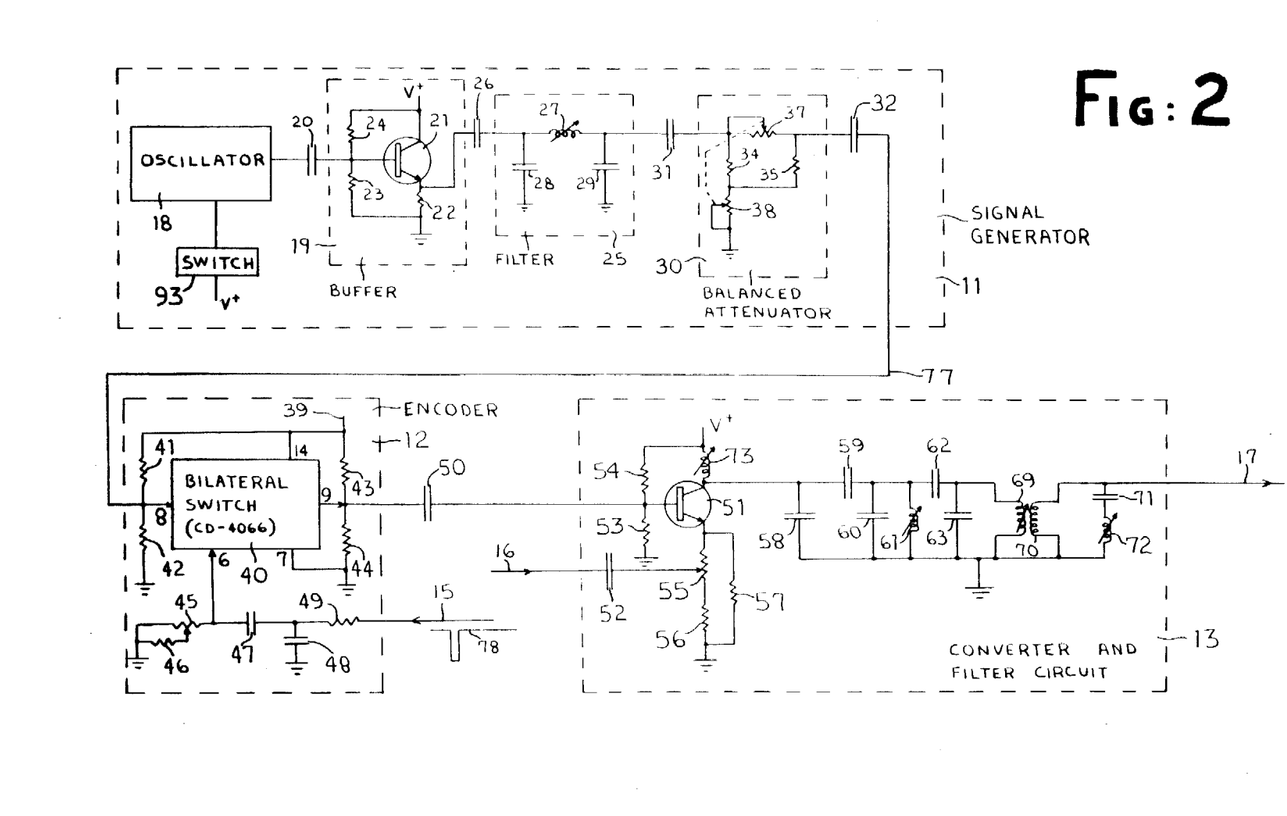
FIG. 2 shows in detail the circuit of an head-end equipment of the device for locating PAY-TV decoders of FIG. 1.

The signal generator 11 comprises, as shown on FIG. 2, an oscillator 18 delivering, when activated through a switch 93, a continuous sinusoidal signal at the frequency of for example 1801 kHz. This oscillator may be designed in a plurality of different ways, but is preferably locked at the required frequency by means of a crystal (quartz for example). This kind of circuit is well known in the art, and for that reason it will not be further elaborated.

The sinusoidal signal at the output of the oscillator 18 is supplied through a coupling capacitor 20 to a buffer 19. This buffer 19 is formed by a common collector amplifier stage comprising a transistor 21 and biasing resistors 22, 23 and 24.

The signal from the buffer 19 is applied through a coupling capacitor 26 to a $\pi$-type trap filter 25 provided for eliminating harmonic components present in the 1801 kHz sinusoidal signal from the buffer 19. This trap filter 25 is formed by a variable inductor 27 and two capacitors 28 and 29 interconnected as shown on FIG. 2 of the attached drawings.

The signal generator 11 finally comprises a balanced attenuator 30 in order to establish a suitable operating level for the sinusoidal signal at the frequency of 1801 kHz. The input of this attenuator 30 is connected to the output of the trap filter 25 through a capacitor 31 and delivers an attenuated 1801 kHz signal through a coupling capacitor 32 at the output 77 of the generator 11.

The balanced attenuator 30 may comprise, for example, two resistors 34 and 35 having a same resistance and two potentiometers 37 and 38 interconnected as shown on FIG. 2. These two potentiometers 37 and 38 are provided for adjustment of the level of the output signal from the generator 11 and their adjustment members are advantageously mechanically interconnected as illustrated by dotted lines.

The 1801 kHz signal at the output 77 of the generator 11 is thereafter encoded by means of the encoder 12. This encoder 12 comprises as shown on FIG. 2 a bilateral switch 40 advantageously constituted by the CMOS integrated circuit CD-4066. The switch 40 is supplied through its pin 14 by an appropriate DC voltage applied to a terminal 39, and has its pin 7 grounded.

The 1801 kHz signal from the generator 11 is applied to an input pin 8 of the switch 40 biased of two resistors 41 and 42. An output 9 of the switch 40 is also biased by means of two resistors 43 and 44.

A control input 6 of the switch 40 is responsive to vertical synchronizing pulses of the composite video signal provided from the encoder 3 through a line 15. As it is known, these vertical synchronizing pulses each indicate the beginning of a corresponding odd or even frame field of the television picture and are produced at the frequency of 60 Hz in North America, which frequency corresponds to the voltage frequency of the electricity power distributing networks of this region. In the present embodiment, the pulses on the line 15 are negative pulses as indicated at 78 on FIG. 2. A resistive-capacitive network, formed by resistors 46 and 49, a potentiometer 45 and capacitors 47 and 48, transforms each negative vertical synchronizing pulse into a positive pulse applied to the input 6 of the switch 40, while delaying such a positive pulse with respect to the corresponding negative synchronizing pulse and determining the duration thereof through its time constant. The delay, with respect to the corresponding vertical synchronizing pulse, and the duration induced to each positive pulse by the resistive-capacitive network are selected so that each of these positive pulses applied to the switch control input 6 closes the switch 40 during a time interval of 762 $\mu$s corresponding to the scanning of the lines 16 to 27 of the corresponding frame field, i.e. the six last lines of the vertical blanking interval and the six first scanning lines of the video field of this corresponding odd or even frame field. The switch 40 therefore transmits to its output pin 9 the input signal at its input pin 8 during such 762 µs time intervals. The encoded signal at the output of the encoder 12 thus corresponds to a wave train, namely an 1801 kHz sinusoidal signal of a duration of 762 µs repeated at a frequency of 60 Hz, i.e. at the beginning of each frame field.

The encoded signal at the output of the encoder 12 is transmitted through a coupling capacitor 50 to the converter and filter circuit 13, more particularly to the base of a transistor 51 forming part of this circuit 13, which base is biased through resistors 53 and 54. The emitter of this transistor 51 is provided with a resistive network formed by resistors 56 and 57 and a potentiometer 55. A sinusoidal signal at the standard intermediate frequency of for example 45.750 MHz is supplied from the modulator 2 of the normal CATV equipment through a connection 16 and is applied to the potentiometer 55 through its movable contact and a coupling capacitor 52. The 1801 kHz wave train at the base of the transistor 51 is mixed with the signal at the intermediate frequency of 45.750 MHz from the connection 16 through the transistor 51 to produce a signal component at a frequency of 43.949 MHz along with other signal components. The signal produced from the transistor 51 is submitted to a four-poles tuned circuit included in the circuit 13 and which transmits the 43.949 MHz signal component on a connection 17 while extracting all the other signal components. Such a tuned circuit is constituted by a filter formed by variable inductors 61, 72 and 73, capacitors 58, 59, 60, 62, 63 and 71, and a transformer comprising a primary winding 69 provided for inductance variation and a secondary winding 70. The 1801 kHz wave train therefore becomes a 43.949 MHz wave train delivered from the converter and filter circuit 13 and which is thereafter applied to the modulator 2 through the connection 17.

Referring now to FIG. 1 of the attached drawings, the modulator 2 of the normal CATV equipment modulates in amplitude the encoded composite video signal from the encoder 3 at the intermediate frequency of 45.750 MHz. The audio signal from the receiver 1, the 43.949 MHz wave train from the converter and filter circuit 13, as well as the composite encoded video signal modulated in amplitude at the frequency of 45.750 MHz are applied to an heterodyne mixer included in the modulator 2 to form the television signal of the concerned PAY-TV channel. As already stated above, the resulting signal of the PAY-TV channel at the output of the modulator 2 is applied to the combiner 4 for being supplied to the distribution network.

At each subscriber's end, a PAY-TV decoder may be provided or not. In the case of a subscriber's end where a television receiver, for example 80 on FIG. 1, is tuned to the concerned PAY-TV channel and is provided with a corresponding PAY-TV decoder, the transmitted composite video signal along with the 1801 kHz wave train are detected and applied to the different video components of this receiver 80. The 1801 kHz wave train which constitutes obviously the identification signal of the concerned PAY-TV channel is therefore processed through the video processing stages of the receiver 80 and finally submitted to the control electrodes of the color or black and white picture tube. Here occurs a propagation phenomenon due to the relatively high voltages of the signals activating the picture tube; in the case of a color picture tube, the electron beam also hits the metallic shadow mask provided behind the luminescent screen of the color tube and such a global system acts as an emitting antenna. The 1801 kHz wave train is thereby emitted through the air from the receiver 80. This above defined emission phenomenon is shown by arrows 81 on FIG. 1.

However, the propagation phenomenon is not limited to the receiver 80 itself. As the 1801 kHz wave train is also induced in related equipments connected to the receiver 80, such as the alternating source supplying the receiver 80 with electrical power, a cable of transmission 82 forming part of the distributing network of the CATV company along with its associated PAY-TV decoder and connector 76, a VCR (video cassette recorder) etc . . . , it is also emitted through these related equipments (see arrows 91 on FIG. 1 in the case of the cable 82 and the connector 76).

The switch 93 (see FIG. 2) disposed between a supply voltage V+ and the oscillator 18 is used to enable or interrupt the generation of the 1801 kHz wave train by energizing or disconnecting the oscillator 18. This switch 93 is advantageously radio-operated in order to enable an operator of the device of the invention to remotely interrupt generation of the 1801 kHz wave train when such a device is not used. Such a switch 93 is particularly useful to reduce the risks of analysis of the identification signal at the subscriber's end for the purpose of designing a circuit adapted to stop such an identification signal in order to prevent its irradiation, compared with the case where the identification signal is continuously generated and introduced in the television signal of the PAY-TV channel.

The 1801 kHz wave train irradiated from the television receiver 80 of FIG. 1 and its related equipments can be detected by an AM (amplitude modulation) radio receiver tuned at 1801 kHz. Thus, as shown for example on FIG. 1, the device for locating PAY-TV decoders comprises a modified AM radio receiver 83, tuned at the frequency of 1801 kHz. This receiver 83 may be installed in a service vehicle 84 of the CATV company and connected to an antenna 85. This receiver 83 may also be possibly a simple battery operated portable AM radio receiver. The modification of the receiver 83 includes the provision of an indicator 86 of the relative intensity of the detected signal and a connector 87 for the purpose of transmitting the detected signal to an oscilloscope 88. This modification also possibly includes an additional radio-frequency amplifier stage and a tuning of the receiving antenna.

As can be easily deduced, when the receiver 83 is tuned at 1801 kHz, this tuning can of course be fine adjusted with the help of the indicator 86, and when the vehicle 84 circulating along a street passes in proximity of a television receiver tuned to the PAY-TV channel in question and provided with a corresponding PAY-TV decoder, the indicator 86 will indicate the presence of such a PAY-TV decoder as the receiver 83 will detect the 1801 kHz wave train irradiated from the concerned television receiver and its related equipments connected thereto, thereby locating this decoder. This detection indicated through the indicator 86 can also be verified by examining the detected waveform on the screen of the oscilloscope 88 when such an oscilloscope is connected to the receiver 83 through the connector 87, in order to prevent any false decoder location as will be seen in greater details hereinbelow.

When the residential houses of a street are relatively remote from each other, the residential house corresponding to the located decoder can be determined only through the detection of the 1801 kHz irradiated wave train. But in the case for example of apartment buildings, such a localization becomes somewhat difficult.

However, as stated above, as the 1801 kHz wave train is also induced in the cable such as 82 interconnecting a television receiver such as 80 and the corresponding multi-tap connector such as 76, by checking each cable outside the apartment building for detecting the wave train in question through an appropriate detector comprising for example an oscilloscope, it is possible to determine accurately in which apartment is located the PAY-TV decoder. It should be noted that the 1801 kHz wave train is induced in the cable 82 up to the multi-tap connector 76 and sometimes beyond this connector. It would also be possible to carry out this accurate location by checking another related equipment connected to the receiver 80 and extending outside the apartment building, in which equipment the 1801 kHz wave train would be also induced.

When the position of the located PAY-TV decoder has been accurately determined, by verifying the list of the PAY-TV channel subscribers of the CATV company, it is easy to determine if the located PAY-TV decoder is an authorized decoder or a pirate decoder. In the latter case, legal measures can be taken.

As an immediate improvement in the determination of the correct origin of the detected irradiated 1801 kHz wave train and when a portable modified AM radio receiver is used, a portable parabolic antenna such as 90 on FIG. 1 can replace the regular <<ferrite>> antenna of such a portable AM radio receiver in order to facilitate the determination of the correct origin of the 1801 kHz wave train, to thereby facilitate the locations of decoders.

Figure 3:
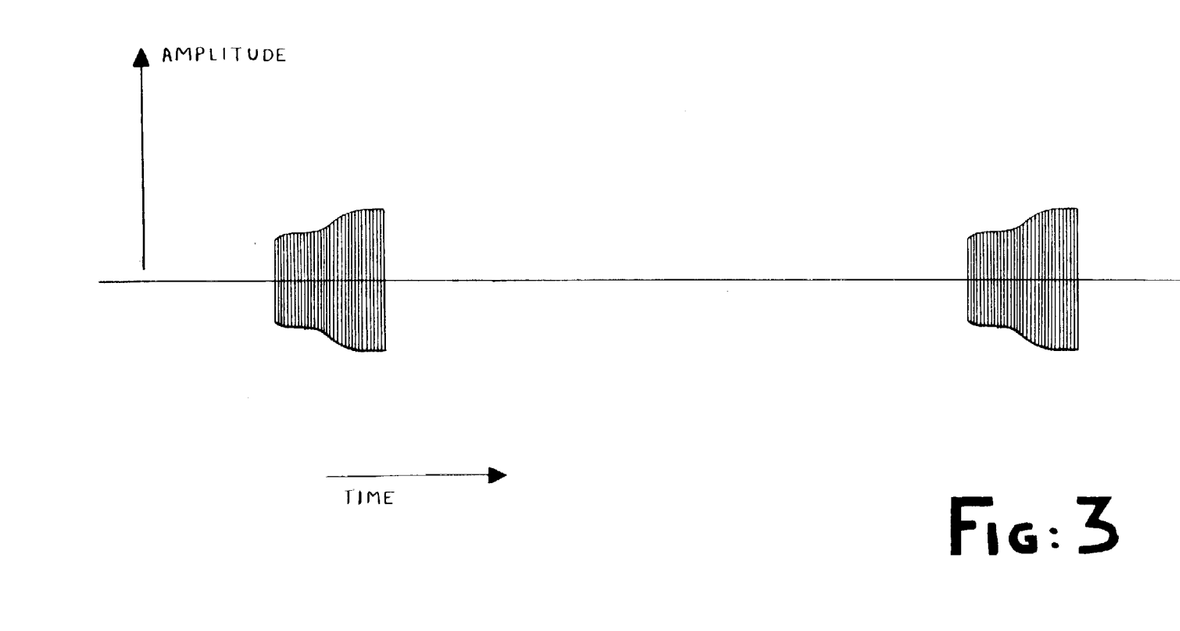
FIG. 3 illustrates, for the locating device of FIG. 1, the waveform of the detected irradiated identification signal of the corresponding PAY-TV channel.

The waveform of the 1801 kHz wave train detected by the modified AM radio receiver 83 when displayed on the oscilloscope 88 is as illustrated on FIG. 3. This specific waveform prevents any false interpretation due to detection of any other signal having the same frequency and duration as the 1801 kHz wave train.

This specific waveform is explained as follows. When the lines 16 to 21 of each frame are scanned i.e. during the six last lines of the vertical blanking interval, the excitation voltages of the picture tube are reduced in amplitude, while these excitation voltages are returned to their normal levels during the scanning of lines 22 to 27, i.e. during the six first lines of the video field of the same frame field, thereby modifying the intensity of the irradiated 1801 kHz wave. This intensity of the irradiated 1801 kHz wave is therefore lower during the scanning of lines 16 to 21 compared with the intensity irradiated during the scanning of lines 22 to 27. The advantage of this waveform is that it can be automatically identified, and consequently any false interpretation upon detection of any other signal of same frequency and duration as the 1801 kHz wave train is thereby eliminated.

Moreover, when the detected 1801 kHz wave is irradiated from a television receiver tuned to the PAY-TV channel and not provided with a corresponding PAY-TV decoder, the waveform on the oscilloscope 88 is unstable and irregular, and therefore recognizable, as the gain control circuits of the television receiver cannot become in synchronization because of the encoded received video signal. Indeed, the video signals applied to the picture tube are unstable and irregular, thereby producing an equivalent wave radiation. The indicator 86 also gives an unstable indication in response to such an unstable and irregular wave radiation, thereby permitting recognition thereof.

The structure of the encoder 12 illustrated on FIG. 2 is very simplified. Such an encoder 12 can of course be designed to carry out other functions as those defined below.

Figure 4:
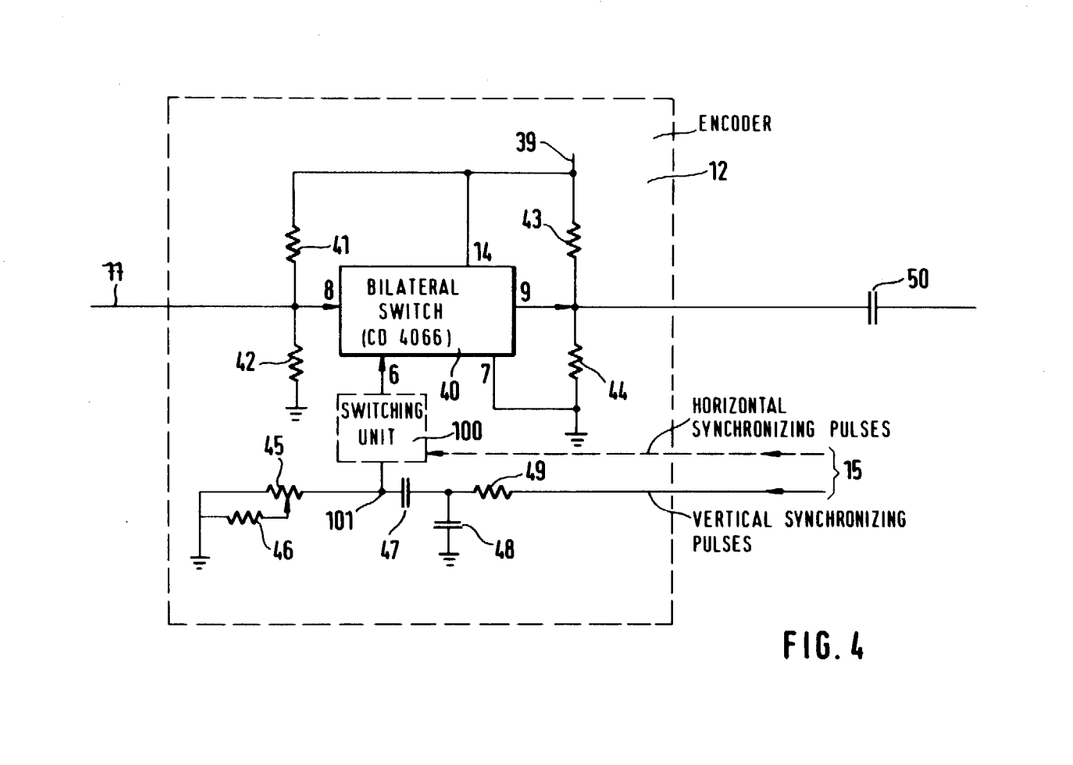
FIG. 4 represents a modification to an encoder forming part of the head-end equipment of FIG. 2.

An identification signal can of course be introduced in the television signal of more than one channel delivered by the CATV company. In this case, as shown in FIG. 4, the encoder 12 may comprise a switching unit 100 interposed between the input 6 of the switch 40 and the interconnecting point 101. The unit 100 is designed to control operation of the switch 40 to produce in response to the pulses at the point 101 a 1801 kHz wave train with predetermined short interruptions in the 1801 kHz sinusoidal signal, which interruptions constitute a code associated to the corresponding channel and can be recognized on the oscilloscope 88 to thereby identify this corresponding channel. Such interruptions which are different for each channel would also allow the means for detecting the 1801 kHz wave train to carry out an automatic identification of the concerned channels upon provision of a suitable design to these detecting means. Of course, it is still possible to locate PAY-TV decoders.

For carrying out such a channel identification, it is also possible to insert any other type of code in the 1801 kHz wave train through the encoder 12, which code is different for each channel and can be recognized on the oscilloscope 88. Such codes may also be identified automatically to thereby identify the corresponding channels by using universal and reliable logic circuits instead of the oscilloscope 88. Again it is still possible to locate PAY-TV decoders.

When an identification signal is introduced in the television signal of all the channels delivered by the CATV company, it is therefore possible to remotely determine which channel has its video signal displayed on a specific television receiver, by identifying to which channel is related the identification signal detected in the proximity of such a specific receiver. It is therefore possible to perform surveying.

The switching unit 100 of the encoder 12 may also be designed for interrupting the 1801 kHz signal during the horizontal synchronizing pulses of the composite video signal to avoid impairment to some types of television receivers. In this case, the horizontal synchronizing pulses are supplied from the encoder 3 to the switching unit 100 of the encoder 12 through the line 15.

It should be pointed out that the 1801 kHz sinusoidal signal produced during the time intervals of 762 μs corresponding to the scanning lines 16 to 27 of the odd and even frame fields is not visible on the video screen of the television receivers provided with decoders when tuned to the PAY-TV channel. Indeed, one skilled in the art knows that the vertical blanking intervals including scanning lines 16 to 21 of the odd and even frame fields as well as the six first scanning lines of the video field, namely scanning lines 22 to 27 of the odd and even frame fields, are not displayed on the video screen of a television receiver when such a receiver is adjusted according to the regular standards. The above characteristic is particularly important in order to meet with government regulations to that effect.

Of course, any other time intervals other than those corresponding to scanning lines 16 to 27 of the odd and even frame fields may be used. The important point is that these time intervals be selected so that the identification signal is not visible on the video screen of the television receivers.

The frequency of 1801 kHz is not either essential to the operation of the invention. Although this 1801 kHz frequency was fully convenient in order to set up the previously described embodiment, it can be changed for obtaining a more efficient operation, i.e. an optimum operation, taking into consideration the video spectrum.

It is also evident that the present invention can be used by broadcast stations, i.e. for an antenna—to—antenna television signal transmission system. In this case, the identification signal is introduced at the broadcast station and the television receivers are each connected to a receiving antenna, which antenna constitutes one of the related equipments in which is induced the identification signal and through which this identification signal is irradiated.

The present invention has been hereinabove described with reference to a possible embodiment thereof. However, it should be pointed out that any modification to this embodiment or application thereof within the scope of the appended claims is not deemed to change the object and nature of the present invention.

I claim:

1. In a television system comprising source means for producing a television signal including a video signal and corresponding to a specific television channel, a plurality of television receivers each situated at a respective position remote from said source means, each provided with video reproducing means and each connected to related equipments, and means for transmitting said television signal from said source means to each of said television receivers, a device for remotely identifying television receivers tuned to said channel and displaying said video signal amongst said plurality of television receivers, comprising:

means for generating an identification signal during predetermined time intervals of said video signal;

means for introducing the generated identification signal in said television signal before transmission of this television signal through the transmitting means, said identification signal being therefore transmitted as part of said television signal from the source means to each of said television receivers through the transmitting means, said introducing means comprising means for introducing the identification signal in the television signal so that said identification signal is detected by each television receiver tuned to said channel and displaying said video signal, and applied to the video reproducing means of such a television receiver, the nature of the identification signal being selected so that it is irradiated in the air through said video reproducing means of each television receiver tuned to said channel and displaying said video signal and through at least a part of said related equipments connected to such a television receiver, the video reproducing means of each of said television receivers including a video screen and said predetermined time intervals being selected so that the identification signal is not visible on the video screen of the television receivers tuned to said channel and displaying said video signal when these receivers have a standard adjustment; and means for detecting the irradiated identification signal, which detecting means comprise means for indicating, when brought in the proximity of one of said television receivers tuned to said channel and displaying said video signal, detection of the irradiated identification signal for the purpose of identifying said one television receiver as a receiver amongst said receivers tuned to said channel and displaying said video signal.

2. An identification device according to claim 1, wherein said video signal comprises horizontal synchronizing pulses occuring during each predetermined time interval and wherein said generating means comprise means for interrupting said identification signal during said horizontal synchronizing pulses.

3. An identification device according to claim 1, in which said generating means comprise means for producing a continuous sinusoidal signal of a predetermined frequency, and switching means for supplying said sinusoidal signal only during said predetermined time intervals, said sinusoidal signal supplied from said switching means constituting said identification signal.

4. An identification device according to claim 1, in which said generating means comprise means for inserting a code in said identification signal, said code being representative of said specific television channel.

5. An identification device according to claim 1, in which said generating means comprise means for giving a specific waveform to said identification signal during each of said predetermined time intervals, and in which said predetermined time intervals are also selected so that said detected irradiated identification signal has a waveform modified with respect to said specific waveform, which specific waveform being modified upon irradiation of the identification signal.

6. An identification device according to claim 5, wherein said detecting means comprise means allowing an operator to recognize said modified waveform, thereby preventing any false television receiver identification upon detection through the detecting means of any other signal.

7. An identification device according to claim 6, wherein said means allowing an operator to recognize said modified waveform comprise an oscilloscope.

8. An identification device according to claim 1, in which said video signal comprises a plurality of successive video frame fields, each predetermined time interval corresponding to a predetermined time interval within one of said successive video frame fields.

9. An identification device according to claim 1, wherein said introducing means comprise converting means for mixing said generated identification signal with a sinusoidal signal having an intermediate frequency to thereby produce a converted identification signal.

10. An identification device according to claim 9, wherein said introducing means comprise means for receiving said converted identification signal and for introducing this converted identification signal in the television signal.

11. An identification device according to claim 10, wherein said converting means comprise means for producing a signal including said converted identification signal along with other signal components, and wherein said introducing means further comprise filter means for blocking said other signal components.

12. An identification device according to claim 1, wherein said detecting means comprise a receiver unit for detecting said irradiated identification signal, and an oscilloscope connected to said receiver unit for visualizing any signal detected through said receiver unit.

13. An identification device according to claim 1, in which said detecting means comprise a receiver unit for detecting said irradiated identification signal, said receiver unit comprising an indicator of the intensity of any detected signal for the purpose of indicating detection thereof.

14. An identification device according to claim 1, wherein said related equipments comprise a cable of transmission of the television signal, said transmission cable forming part of said transmitting means.

15. An identification device according to claim 1, wherein at least one of said related equipments of a television receiver amongst said television receivers extends outside a residence in which this television receiver is situated, said identification signal being induced in said one related equipment when the corresponding television receiver is tuned to said channel and displays said video signal, said identification device further comprising means for detecting said identification signal induced in said one related equipment from the outside of the residence for the purpose of identifying more reliably the corresponding television receiver.

16. An identification device according to claim 1, wherein said detecting means comprise a receiver unit provided with a parabolic antenna.

17. An identification device according to claim 1, comprising means for enabling or interrupting said introduction of the identification signal in the television signal.

18. An identification device according to claim 17, wherein said enabling or interrupting means comprises remotely-operated switching means acting on said generating means.

19. In a television system comprising source means for producing a television signal including an encoded video signal and corresponding to a specific television channel, television receivers each situated at a respective position remote from said source means, each provided with video reproducing means and each connected to related equipments, and means for transmitting said television signal from said source means to each of said television receivers, a plurality of said television receivers being each provided with a decoder for decoding said encoded video signal, a device for remotely locating said decoders comprising:

means for generating an identification signal during predetermined time intervals of a video signal forming said encoded video signal after encoding thereof;

means for introducing the generated identification signal in said television signal before transmission of this television signal through the transmitting means, said identification signal being therefore transmitted as part of said television signal from the source means to each of said television receivers through the transmitting means, said introducing means comprising means for introducing the identification signal in the television signal so that said identification signal is detected by each television receiver provided with a decoder when such a receiver is tuned to said channel and displays said video signal, and applied to the video reproducing means of such a television receiver, the nature of the identification signal being selected so that it is irradiated in the air through said video reproducing means of each television receiver provided with a decoder when such a receiver is tuned to said channel and displays said video signal and through at least a part of said related equipments connected to such a television receiver, the video reproducing means of each of said television receivers including a video screen and said predetermined time intervals being selected so that the identification signal is not visible on the video screen of the television receivers each provided with a decoder when these receivers are tuned to said channel, display said video signal and have a standard adjustment; and means for detecting the irradiated identification signal, which detecting means comprising means for indicating, when brought in the proximity of one of said television receivers provided with a decoder, tuned to said channel and displaying said video signal, detection of the irradiated identification signal for the purpose of locating the decoder of said one television receiver.

20. A device for locating decoders according to claim 19, in which said identification signal is also irradiated from the video reproducing means and at least a part of the related equipments of each television receiver not provided with a decoder when such a receiver is tuned to said channel and displays said video signal as in the case of said television receivers each provided with a decoder, but in an unstable and irregular waveform, said detecting means comprising means for recognizing said unstable and irregular waveform in order to prevent any false decoder location upon detection through these detecting means of said irradiated identification signal with an unstable and irregular waveform.

21. A device for locating decoders according to claim 19, wherein said transmitting means comprise for each of said television receivers a transmission cable connected to such a television receiver and extending outside a residence in which the television receiver connected thereto is situated, said identification signal being induced in the transmission cable connected to each television receiver tuned to said channel and displaying said video signal, said device for locating decoders further comprising means for detecting said identification signal induced in the transmission cable connected to said one television receiver for the purpose of more reliably and accurately locating the decoder of said one television receiver, which detecting means comprising means for carrying out said detection of the identification signal induced in the transmission cable of said one television receiver from outside a residence in which is situated said one television receiver, wherein said detection of the identification signal induced in the transmission cable connected to said one television receiver is used when detection of the identification signal irradiated from the video reproducing means and at least a part of the related equipments of said one television receiver cannot accurately locate the decoder thereof.

22. In a television system comprising source means for producing a plurality of television signals each including a video signal and each corresponding to a specific television channel, a plurality of television receivers each situated at a respective position remote from said source means, each provided with video reproducing means and each connected to related equipments, and means for transmitting said television signals from said source means to each of said television receivers, a device for remotely determining the channel amongst said channels which has its video signal displayed by said television receivers, comprising for each channel:

means for generating an identification signal during predetermined time intervals of the video signal of the corresponding channel;

said generating means comprising means for inserting a code in said identification signal, said code being representative of the corresponding channel and thereby allowing identification of this channel; and means for introducing the generated identification signal in said television signal of the corresponding channel before transmission of this television signal through the transmitting means, said identification signal being therefore transmitted as part of said television signal of the corresponding channel from the source means to each of said television receivers through the transmitting means, said introducing means comprising means for introducing the identification signal in said television signal of the corresponding channel so that said identification signal is detected by each television receiver tuned to the corresponding channel and displaying the video signal thereof, and applied to the video reproducing means of such a television receiver, the nature of the identification signal being selected so that it is irradiated in the air through said video reproducing means of each television receiver tuned to the corresponding channel and displaying the video signal thereof and through at least a part of said related equipments connected to such a television receiver, the video reproducing means of each of said television receivers including a video screen and said predetermined time intervals being selected so that the identification signal is not visible on the video screen of the television receivers tuned to the corresponding channel and displaying the video signal thereof when these receivers have a standard adjustment;

said determining device further comprising means for detecting the irradiated identification signals, which detecting means comprising means for detecting, when brought in the proximity of one of said television receivers tuned to one of said channels and displaying the video signal thereof, the identification signal of said one channel irradiated through the video reproducing means of said one television receiver and through at least a part of the related equipments connected to said one receiver, and means for recognizing the code inserted in the irradiated identification signal of said one channel and for indicating that said one television receiver is tuned to said one channel and that the video signal of said one channel is displayed through said one television receiver.

23. A method for remotely identifying television receivers tuned to a specific television channel and displaying a video signal of said channel amongst a plurality of television receivers in a television system comprising source means for producing a television signal including said video signal and corresponding to said specific television channel, said plurality of television receivers each situated at a respective position remote from said source means, each provided with video reproducing means and each connected to related equipments, and means for transmitting said television signal from said source means to each of said television receivers, said method comprising the steps of:

generating an identification signal during predetermined time intervals of said video signal;

introducing the generated identification signal in said television signal before transmission of this television signal through the transmitting means, said identification signal being therefore transmitted as part of said television signal from the source means to each of said television receivers through the transmitting means, the nature of the identification signal as well as the way of introducing it in the television signal being selected so that said identification signal is detected by each television receiver tuned to said channel and displaying said video signal, applied to the video reproducing means of such a television receiver, and irradiated in the air through the video reproducing means of such a television receiver and through at least a part of said related equipments connected thereto, the video reproducing means of each of said television receivers including a video screen and said predetermined time intervals being selected so that the identification signal is not visible on the video screen of the television receivers tuned to said channel and displaying said video signal when these receivers have a standard adjustment; and detecting the irradiated identification signal in the proximity of one of said television receivers tuned to said channel and displaying said video signal for the purpose of identifying said one television receiver as a receiver amongst said television receivers tuned to said channel and displaying said video signal, which detecting step is carried out for each television receiver identification.

24. A method according to claim 23, in which said identification signal generated during each predetermined time interval has a specific waveform, and in which said predetermined time intervals are selected so that said detected irradiated identification signal has a waveform modified with respect to said specific waveform, which specific waveform being modified upon irradiation of the identification signal.

* * * * *